United States Patent
Durst et al.

(10) Patent No.: US 9,447,762 B2
(45) Date of Patent: Sep. 20, 2016

(54) FUEL INJECTION SYSTEM

(71) Applicant: FMP TECHNOLOGY GmbH FLUID MEASUREMENTS & PROJECTS, Erlangen (DE)

(72) Inventors: Franz Durst, Langensendelbach (DE); Michael Zeilmann, Erlangen (DE); Ritesh Prashanna Mohanty, Erlangen (DE)

(73) Assignee: FMP TECHNOLOGY GmbH FLUID MEASUREMENTS & PROJECTS, Erlangen (DE)

( * ) Notice: Subject to any disclaimer, the term of this patent is extended or adjusted under 35 U.S.C. 154(b) by 0 days.

(21) Appl. No.: 14/415,051

(22) PCT Filed: Jul. 19, 2013

(86) PCT No.: PCT/EP2013/065318
§ 371 (c)(1),
(2) Date: Jan. 15, 2015

(87) PCT Pub. No.: WO2014/013059
PCT Pub. Date: Jan. 23, 2014

(65) Prior Publication Data
US 2015/0167612 A1    Jun. 18, 2015

(30) Foreign Application Priority Data
Jul. 19, 2012   (DE) .......................... 10 2012 212 745

(51) Int. Cl.
*F02M 55/04*   (2006.01)
*F16L 55/04*   (2006.01)
(Continued)

(52) U.S. Cl.
CPC ..... *F02M 63/0275* (2013.01); *F02M 37/0041* (2013.01); *F02M 55/04* (2013.01); *F16L 55/04* (2013.01); *F02M 2200/315* (2013.01)

(58) Field of Classification Search
CPC ............. F02M 55/04; F02M 37/0041; F02M 63/0275; F02M 2200/31; F02M 2200/315; F16L 55/02; F16L 55/04
USPC ...................... 123/375, 390, 456, 457, 192.1
See application file for complete search history.

(56) References Cited

U.S. PATENT DOCUMENTS 2,409,304 A    10/1946   Morrison
6,390,131 B1 *  5/2002   Kilgore ................... F16L 55/04
                                                                123/456

(Continued)

FOREIGN PATENT DOCUMENTS

DE          103 51 089 A1      5/2005
DE     10 2004 008 590 B3      8/2005
(Continued)

OTHER PUBLICATIONS

PCT, "Written Opinion of the International Searching Authority for International Application No. PCT/EP2013/065318."

(Continued)

*Primary Examiner* — Grant Moubry
(74) *Attorney, Agent, or Firm* — Manabu Kanesaka

(57) ABSTRACT

The invention relates to a fuel injection system, in particular a common rail injection system, in which fuel is conducted from a distributor pipe via high-pressure lines to injectors, by means of which the fuel can be injected during an injection cycle with a number of injection pulses, wherein each of the high-pressure lines is provided with at least one damping device for damping pressure pulsations. In order to simplify the production of the damping device, the damping device has a pipe, in which a core that is held at a distance via spacers so as to form an annular gap is provided.

12 Claims, 5 Drawing Sheets

(51) Int. Cl.
*F02M 63/02* (2006.01)
*F02M 37/00* (2006.01)

(56) References Cited

U.S. PATENT DOCUMENTS

| | | | | |
|---|---|---|---|---|
| 6,401,691 | B1* | 6/2002 | Kawano | F02M 55/025 123/456 |
| 7,124,738 | B2* | 10/2006 | Usui | F02M 55/04 123/446 |
| 7,401,594 | B2* | 7/2008 | Usui | F02M 55/04 123/447 |
| 8,393,881 | B2* | 3/2013 | Usui | F02M 55/04 417/540 |
| 8,402,947 | B2* | 3/2013 | Kannan | F01N 1/083 123/456 |
| 2009/0301438 | A1* | 12/2009 | D'Onofrio | F02M 55/025 123/455 |

FOREIGN PATENT DOCUMENTS

| | | |
|---|---|---|
| DE | 10 2005 022 698 A1 | 11/2006 |
| DE | 10 2006 016 937 A1 | 10/2007 |
| DE | 10 2009 016 689 A1 | 10/2010 |
| DE | 10 2009 029 219 A1 | 3/2011 |
| EP | 1 741 925 A1 | 1/2007 |
| GB | 2 356 020 A | 5/2001 |
| JP | H08-261099 A | 10/1996 |
| JP | H09-170514 A1 | 6/1997 |
| WO | 2004/036029 A1 | 4/2004 |

OTHER PUBLICATIONS

PCT, "International Search Report for International Application No. PCT/EP2013/065318".

Holger Watter: Hydraulik und Pneumatik, 2nd edition, Wiesbaden: Vieweg+ Teubner, 2008, p. 51—ISBN 978-3-8348-0539-3.

* cited by examiner

FUEL INJECTION SYSTEM

RELATED APPLICATIONS

The present application is National Phase of International Application No. PCT/EP2013/065318 filed Jul. 19, 2013, and claims priority from German Application No. 10 2012 212 745.3, filed Jul. 19, 2012, the disclosure of which is hereby incorporated by reference herein in its entirety.

The invention relates to a fuel injection system, in particular a common rail injection system, according to the preamble of Claim 1.

Such a fuel injection system is known for example from WO 2004/036029 A1. In the known fuel injection system a damping device for damping pressure pulsations has a sintered metal insert.

DE 103 51 089 A1 discloses method for reducing pressure pulsations in a hydraulic system having a hydraulic flow which is fed to a pulsation damper. The pulsation damper has a plurality of flow channels for dividing the hydraulic flow into a plurality of sub-flows.

EP 1 741 925 A1 concerns an injector that has a damper provided with a number of bores.

JP 08261099 A discloses a pulsation damper in which balls having two different diameters are received in a housing.

DE 10 2006 016 937 A1 discloses a hydraulic pulsation damper in which a filter element formed from foamed polyethylene or sintered metal fabric or glass fibre fabric is received as damping means in a housing.

The damping devices known in accordance with the prior art require a relatively high production effort. Insofar as porous media can be used as damping means, there is a risk of obstruction by dirt particles. In the case of diesel vehicles, there is the further risk of a clogging of the filter medium by precipitated paraffin, in particular in winter at lower temperatures.

One object of the present invention is to overcome the disadvantages according to the prior art. In particular, a fuel injection system comprising a damping device that can be produced easily and cost-effectively is to be specified. In accordance with a further object of the invention, the damping device is to ensure continuous operation of the fuel injection system to the greatest possible extent.

This object is achieved by the features of Claim 1. Expedient embodiments of the invention will emerge from the features of Claims 2 to 13.

In accordance with the invention, it is proposed for the damping device to have a pipe, in which a core that is held at a distance via spacers so as to form an annular gap is provided. The proposed damping device can be produced easily and cost-effectively with use of few parts. The provision of an annular gap makes the damping device unsusceptible to clogging caused by impurities or paraffin contained in the fuel.

In the sense of the present invention, the term "annular gap" means a passage extending substantially over the entire axial length of the core, which is preferably cylindrical. The annular gap has a radial gap width that is substantially constant over the entire axial length of the core. The annular gap has substantially annular inlet and outlet openings. The annular gap can also be interrupted over the periphery thereof, for example by the spacers necessary to hold the core.

It has proven to be advantageous for an axial length l of the core to be 0.5 to 50 mm. A gap width δ given by the difference of an inner diameter d of the pipe and an outer diameter D of the core is expediently between 5 μm to 200 μm. Furthermore, it has proven to be expedient if the outer diameter D of the core is approximately 0.5 to 50 mm, preferably 2 to 20 mm. A damping device formed in this way is characterised in particular for common rail injection systems by excellent damping of pressure pulsations.

In accordance with an advantageous embodiment of the invention, the length l and the gap width δ are selected such that a pressure loss ΔP is between 3 and 12 bar, preferably between 6 and 9 bar, wherein the following is true:

$$\Delta P = [\text{const.} * \mu * \dot{v} * l]/[\delta^3 * D], \text{ wherein}$$

μ is a predefined viscosity of the liquid fuel,
$\dot{v}$ is a set volume flow rate, and
D is the outer diameter of the core.

The value μ is the viscosity of the used liquid fuel, for example the viscosity of diesel fuel or petrol. The predefined volume flow rate is given in particular from the embodiment of the used injectors, the injection pressure and the injection times. As is clear from the above relationship, the pressure loss ΔP is expediently fixed to a value of 7 bar, for example. With given viscosity of the liquid fuel and also given volume flow rate, a suitable relationship between the length l, the outer diameter D of the core and also the gap width δ is given as a result. By way of example, a suitable gap width δ can be calculated at predefined length l or vice versa. The aforementioned pressure loss ΔP is true for $\mu = 10^{-3}$ Ns/m² and $\dot{v} = 0.25$ l/min. For other viscosities μ and/or volume flow rates $\dot{v}$, a suitable pressure loss ΔP can be calculated in accordance with the above formula.

In accordance with an advantageous embodiment, the spacers are distributed uniformly over the outer periphery of the core. In particular, n spacers can be distributed over the outer periphery of the core, in each case distanced from one another by an angle of 360°/n.

The spacers may be separate parts which are formed in a rod-like or web-like manner, for example. The core can thus be held in the pipe with a friction fit so as to form an annular gap. The rod- or web-shaped spacers expediently extend over the entire axial length of the core. The core is preferably cylindrical. It may be pointed conically at least at one end.

In accordance with an advantageous embodiment of the invention, the core is formed in one piece with the spacers. Similarly, the pipe can also be formed in one piece with the spacers. The core and/or the pipe is/are expediently produced by means of extrusion. The pipe and/or the core are expediently produced from metal, preferably from high-grade steel.

In accordance with a particularly advantageous embodiment of the invention, the core is shrunk into the pipe. The process of the shrinking can be performed in a simple and cost-effective manner. Compared to the prior art, a damping device for damping pressure pulsations in a fuel injection system can thus be produced in a particularly simple and cost-effective manner.

In accordance with a further embodiment, the spacers are formed from pins that are inserted into bores provided in the core. The bores may be blind holes. The pins extend over the periphery of the core at a predefined spacing. The outer surface of said pins facing the pipe may have a radius that corresponds to the inner radius of the pipe, such that the pins rest against the inner wall of the pipe in a form-fitting manner in the assembled state. The bores run radially with respect to an axis of the core. At least three pins, preferably four pins, are advantageously distributed uniformly over the periphery in an axial plane of the core and act as spacers.

An exemplary embodiment of the invention will be explained in greater detail hereinafter with reference to drawings, in which:

FIG. 1 shows a schematic view of a fuel injection system,
FIG. 2 shows a plan view of a damping device,
FIG. 3 shows a side view of the core according to FIG. 2,
FIG. 4 shows an embodiment of a core,
FIG. 5 shows a further embodiment of a core,
FIG. 6 shows a plan view of a second damping device,
FIG. 7 shows a plan view of a third damping device,
FIG. 8 shows a plan view of the core according to FIG. 7,
FIG. 9 shows a simulation of the pressure profile at the injector and also at the common rail pipe without damping device,
FIG. 10 shows a measurement of the pressure profile at the injector and also at the common rail pipe without damping device,
FIG. 11 shows a simulation of the pressure profile at the injector and at the common rail pipe with damping device,
FIG. 12 shows a further simulation of the pressure profile at the injector and at the common rail pipe without damping device,
FIG. 13 shows a further simulation according to FIG. 10, wherein a damping device is provided,
FIG. 14 shows a side view of a further embodiment of a core, and
FIG. 15 shows a plan view according to FIG. 14.

FIG. 1 schematically shows a fuel injection system according to the invention, specifically a common rail injection system. Fuel F is received in a tank 1. A fuel filter 3 is arranged in a fuel line 2 leading away from the tank 1. Reference sign 4 denotes a fuel conveyor pump, with which the fuel F is fed to a high-pressure pump 6 via a pressure-regulating valve 5. The high-pressure pump 6 is connected via a first high-pressure line 7 to a distributor pipe 8. The distributor pipe 8 is connected in each case via a second high-pressure line 9 to an injector 10. In the present example, four second high-pressure lines 9 are provided, to each of which an injector 10 is connected downstream.

Reference sign 11 denotes a control apparatus, by means of which the injectors 10 are controlled in accordance with a number of parameters. The control apparatus 10 is connected, inter alia, to a pressure limiter 12, a rail pressure sensor 13, a fuel temperature sensor 14 and also the pressure-regulating valve 5 for measurement and/or control purposes. Reference sign 14 denotes damping devices provided downstream on the distributor pipe 8.

The damping devices 14 are mounted here directly on the distributor pipe 8, in each case at an outlet provided for each of the second high-pressure lines 9. The second high-pressure lines 9 are connected to an outlet of the damping devices 14. However, it may also be that the damping devices 14 are arranged in the second high-pressure lines 9 or are fitted at an injector-side end of the second high-pressure lines 9.

FIG. 2 shows a plan view of a damping device 14. It comprises a pipe 15, in which a core 17 is held by means of spacers 16. As can be seen in particular in conjunction with FIG. 3, the spacers 16 extend over the entire axial length of the cylindrical core 17. They are distanced from one another radially by 90°.

The core 17 is expediently shrunk into the pipe 15. This ensures a secure and reliable retention of the core 17 in the pipe 15. Reference sign 18 denotes an annular gap remaining between the spacers 16, the core 17 and the pipe 15.

The annular gap 18 can be interrupted in particular by spacers 16. It can also be divided by the spacers 16 into annular gap portions that each form a separate passage for the fuel F flowing through.

FIG. 4 shows an exemplary embodiment of a core 17. Here, second spacers 19 are wound around the outer periphery of the core 17, i.e. are formed in the manner of a portion of a helix. Consequently, a flow with a twist forms with use of such a core 17 in the damping device 14. The damping behaviour of the damping device 14 can be influenced by the embodiment of the second spacers 19.

FIG. 5 shows a further embodiment of a core 17, on the outer periphery of which third spacers 20 are provided. The third spacers 20 in this case do not extend over the entire axial length of the core 17, but merely over a relatively small axial portion.

FIG. 6 shows a further damping device. Fourth spacers 22 are formed integrally on the inner side of the pipe 21. A pipe 21 of this type can be produced for example by means of extrusion. A cylindrical core 17 can be quickly and easily secured therein by means of shrinking.

FIGS. 7 and 8 show a plan view of a third damping device. Here, a core 17 that is formed in a "gearwheel-like" manner in cross section is held in a cylindrical pipe 15. The core 17 can be produced by means of extrusion, for example. It is expediently shrunk into the pipe 15.

The damping device can have a length from 2 to 50 mm, preferably 5 to 20 mm. The gap width is expediently 5 to 200 μm, preferably 80 to 120 μm. The damping device can be arranged in the region of the distributor pipe 8, in particular at the inlet of the distributor pipe 8 and/or in the second high-pressure lines 9.

In accordance with a particularly advantageous embodiment, the damping element is combined with a pressure measuring arrangement. The pressure upstream and downstream of the damping device can be measured using the pressure measuring arrangement. The momentary mass flow can be determined from the difference between the measured pressures.

The damping device can have a feed pipe upstream of the core and a discharge pipe downstream of the core. A diameter of the feed pipe and discharge pipe are expediently smaller than a diameter of the pipe surrounding the core. A feed pipe and discharge pipe can each be provided with a bore, preferably a threaded bore, for connection of the pressure measuring arrangement.

FIG. 9 shows the pressure profile at the injector and also at the common rail pipe in a fuel injection system that has no damping device. The simulation is based on a calculation that has been performed with the program "LMS Imagine.Lab AMESim" from the company LMS International NV. The simulation has been performed with use of the following boundary conditions:

| | |
|---|---|
| pressure | 200 bar |
| volume of the common rail pipe | 60 cm$^3$ |
| diameter of the injection line | 3 mm |
| length of the injection line | 87 mm |
| diameter of the electronically controllable opening | 2 mm |
| injected volume | 0.5 mm$^3$ |
| diameter of the nozzle | 0.3 mm |

It can be seen in particular from the pressure profile at the common rail pipe (solid line) that the injector is opened in the time window between 1 ms and 5 ms. Pressure pulsations that have an initial maximum amplitude of approximately 10 bar and then decrease are produced at the injector (dashed line) from the moment 5 ms.

| | |
|---|---|
| inner diameter d of the pipe | 10.00 mm |
| outer diameter D of the core | 9.94 mm |
| length l of the damper | 10.00 mm |

Figure 1:
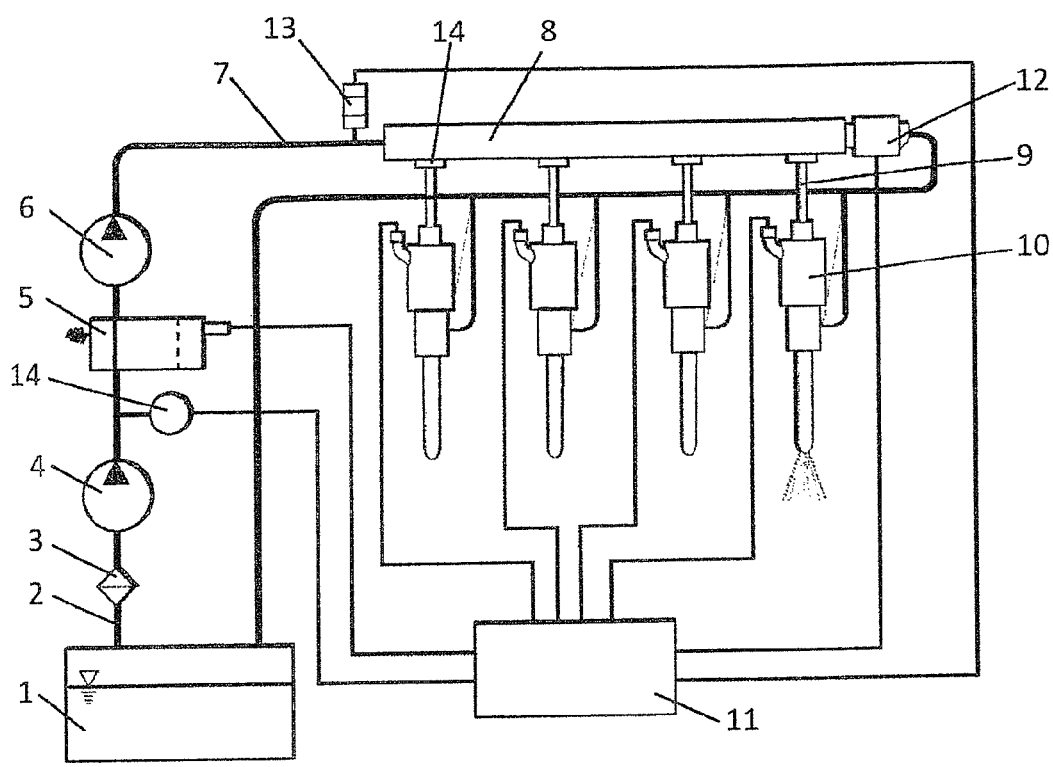
Figure 2:
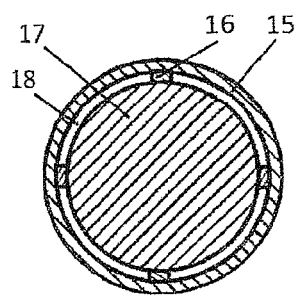
Figure 3:
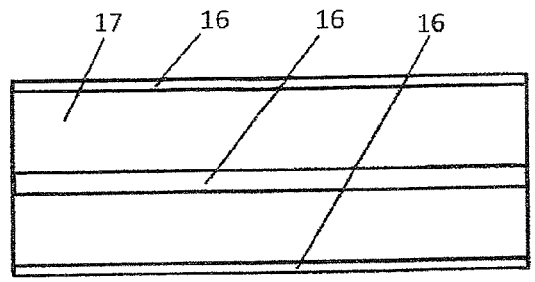
Figure 6:
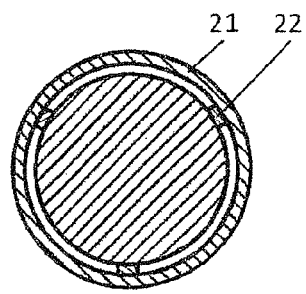
Figure 4:
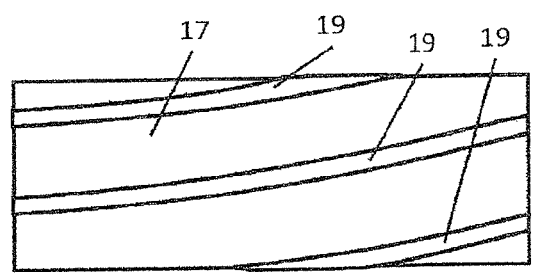
Figures 7, 8:
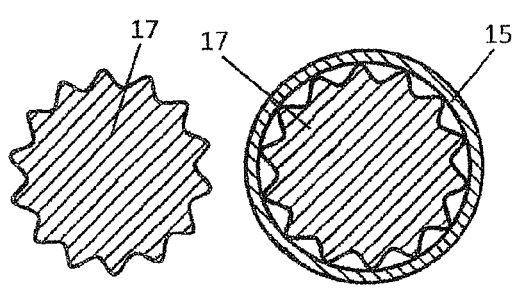
Figure 5:
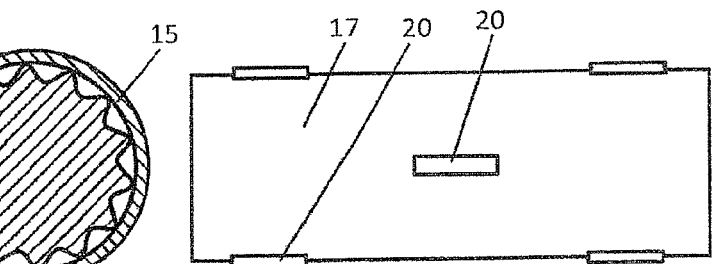
Figure 9:
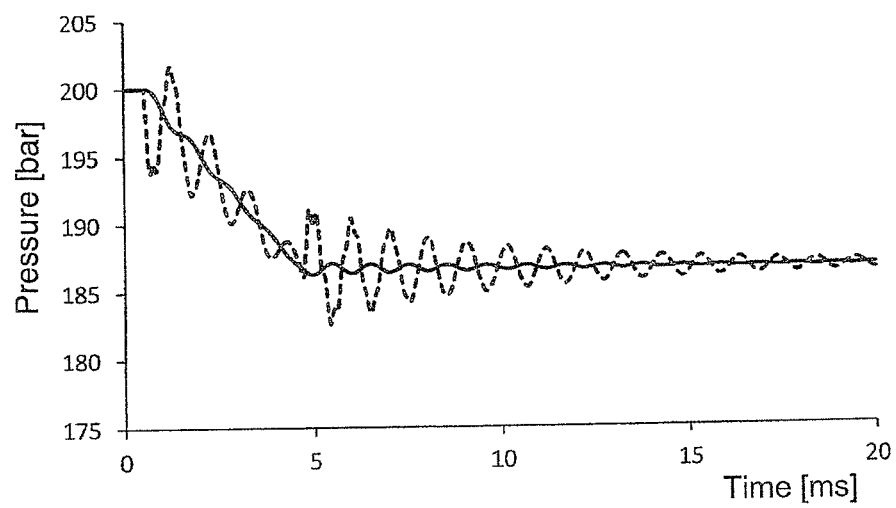
Figure 10:
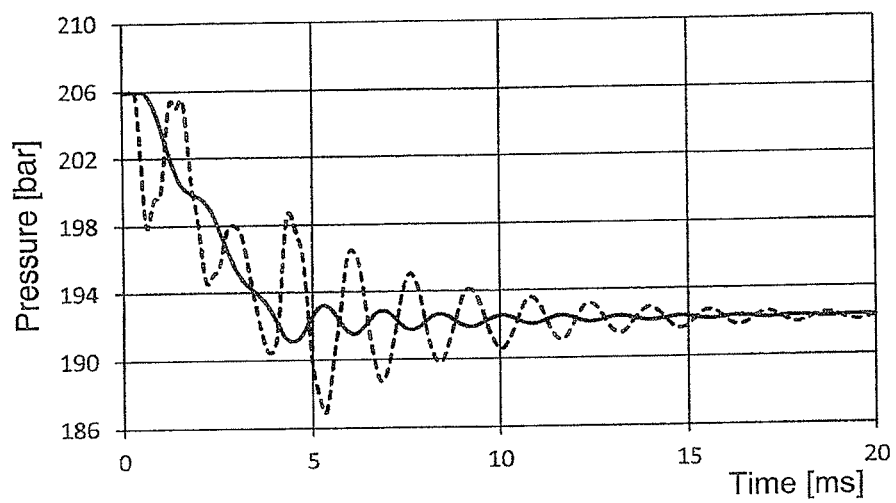
FIG. 10 shows the result of measurements confirming the simulation presented in FIG. 9. Here also, the injector (dashed line) opens in the time window between approximately 1 ms to 5 ms.
Figure 11:
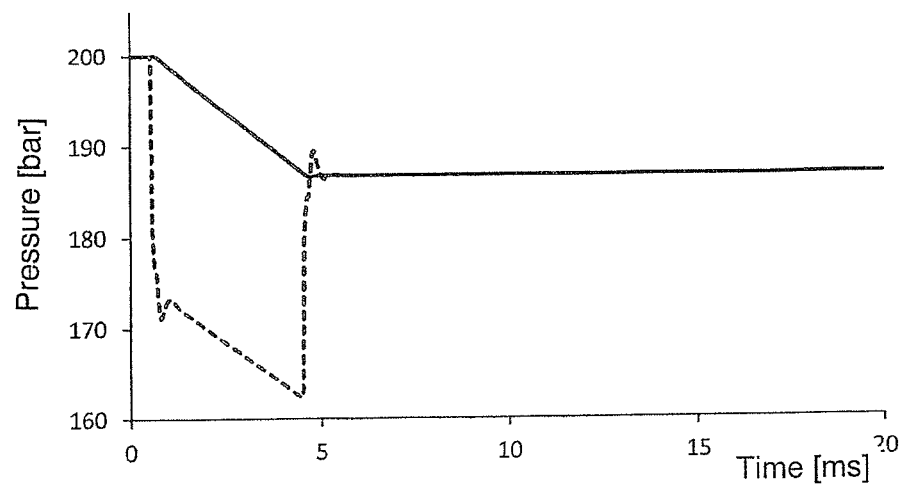
FIG. 11 shows a simulation of the pressure profiles at the injector (dashed line) and at the common rail pipe (solid line), wherein the fuel injection system is provided with a damping device according to the invention. The following further parameters have been used for the simulation.

As can be seen from FIG. 11, hardly any pressure pulsations continue in the fuel injection system following closure of the injector. In particular, no pressure pulsations are to be observed at the common rail pipe.

Figure 12:
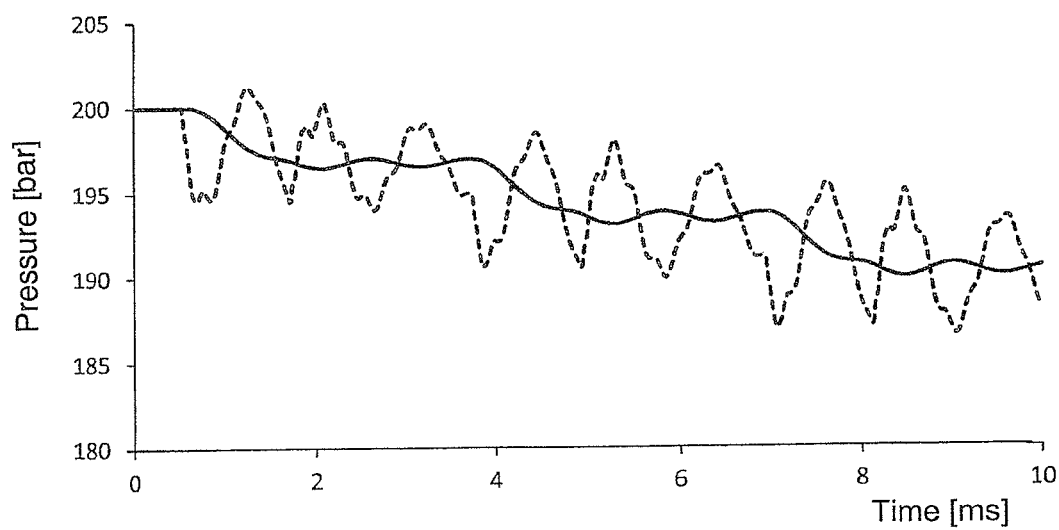

FIG. 12 shows a further simulation of the pressure profiles at the injector (dashed line) and at the common rail pipe (solid line), wherein no damping device is provided. The further simulation concerns a multiple injection, wherein the injector is opened three times for a period of approximately 1.5 ms. As can be seen from FIG. 12, considerable pressure pulsations occur here at the injector.

Figure 13:
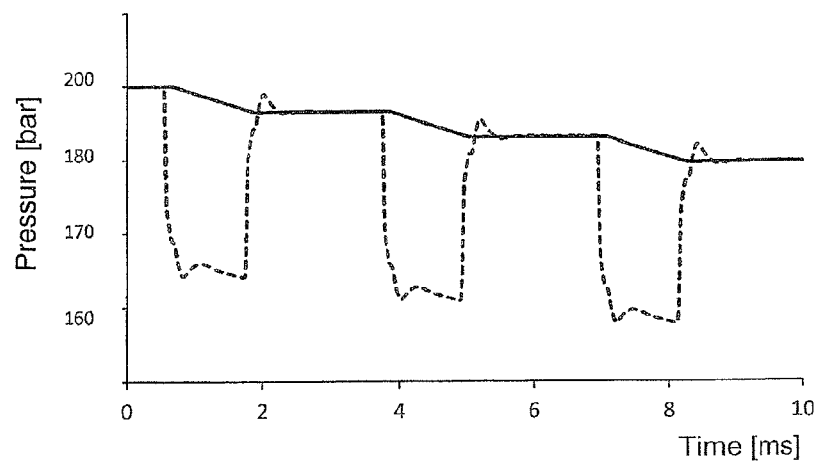

FIG. 13 shows a further simulation according to FIG. 12, wherein here the fuel injection system is provided with a damping device according to the invention. Here too, it can be seen that practically no pressure pulsations continue to occur at the injector (dashed line) or at the common rail (solid line).

In the case of the simulations shown in FIGS. 12 and 13, the above boundary conditions were used.

The proposed damping device in a fuel injection system, in particular in a common rail injection system, thus results in excellent damping of pressure pulsations. It is thus possible to better control the combustion in an internal combustion engine and therefore to avoid an undesirable exhaust gas emission.

Figure 14:
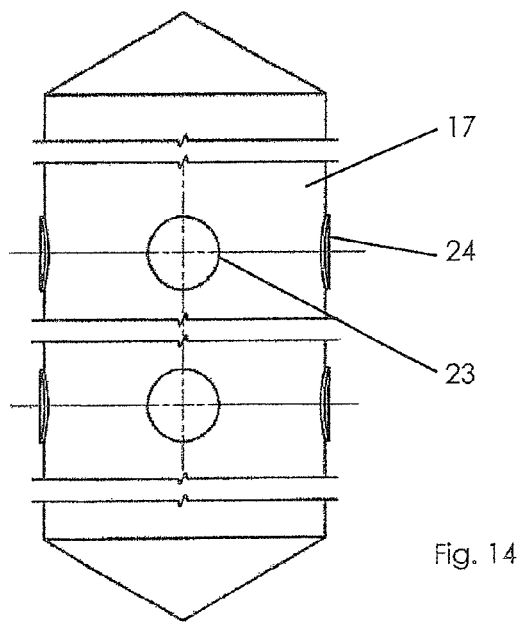
Figure 15:
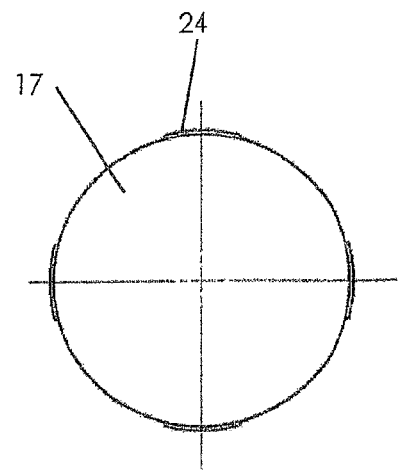

FIGS. 14 and 15 show a further embodiment of a core 17. The core 17 has a cylindrical middle part. The two ends of the core 17 are conical and taper to a point. The core 17 has radially running bores 23, in which pins 24 are inserted, which protrude from the periphery of the core 17 by a predefined distance. The pins 24 act as spacers. The bores 23 are advantageously distributed radially over the periphery, offset by 90°. A plurality of axial planes can be provided, in which three, four, or more pins 24 are provided radially around the periphery. The core 17 described in FIGS. 14 and 15 can be fitted or shrunk into a cylindrical pipe 15 similarly to the cores 17 described in FIGS. 2 to 7. A damping device that can be easily produced is thus created.

LIST OF REFERENCE SIGNS 1 tank
2 fuel line
3 fuel filter
4 fuel conveying pump
5 pressure-regulating valve
6 high-pressure pump
7 first high-pressure line
8 distributor pipe
9 second high-pressure line
10 injector
11 control apparatus
12 pressure limiter
13 rail pressure sensor
14 damping device
15 pipe
16 first spacer
17 core
18 annular gap
19 second spacer
20 third spacer
21 further pipe
22 fourth spacer
23 bore
24 pin
F fuel

The invention claimed is:

1. A fuel injection system, in particular a common rail injection system, in which fuel is conducted from a distributor pipe via high-pressure lines to injectors, by means of which the fuel can be injected during an injection cycle with a number of injection pulses, wherein each of the high-pressure lines is provided with at least one damping device for damping pressure pulsations,
wherein the damping device has a pipe, in which a core that is held at a distance via spacers so as to form an annular gap is provided.

2. The fuel injection system according to claim 1, wherein an axial length l of the core is 0.5 to 50 mm.

3. The fuel injection system according to claim 1, wherein a gap width δ given by a difference of an inner diameter d of the pipe and an outer diameter D of the core is 5 μm to 200 μm.

4. The fuel injection system according to claim 3, wherein the outer diameter D of the core is 10 to 20 mm.

5. The fuel injection system according to claim 1, wherein the spacers are distributed uniformly over an outer periphery of the core.

6. The fuel injection system according to claim 5, wherein n spacers are distributed over the outer periphery of the core, in each case distanced from one another by an angle of 360°/n.

7. The fuel injection system according to claim 1, wherein the core is formed in one piece with the spacers.

8. The fuel injection system according to claim 1, wherein the pipe is formed in one piece with the spacers.

9. The fuel injection system according to claim 1, wherein the core and/or the pipe is/are produced by means of extrusion.

10. The fuel injection system according to claim 1, wherein the pipe and/or the core is/are produced from metal.

11. The fuel injection system according to claim 1, wherein the core is shrunk into the pipe with interpositioning of the spacers.

12. The fuel injection system according to claim 1, wherein the spacers are formed from pins that are inserted into bores provided in the core.

* * * * *